(No Model.)
T. McHUGH.
COUPLING FOR WATER CLOSET BOWLS.
No. 410,848. Patented Sept. 10, 1889.
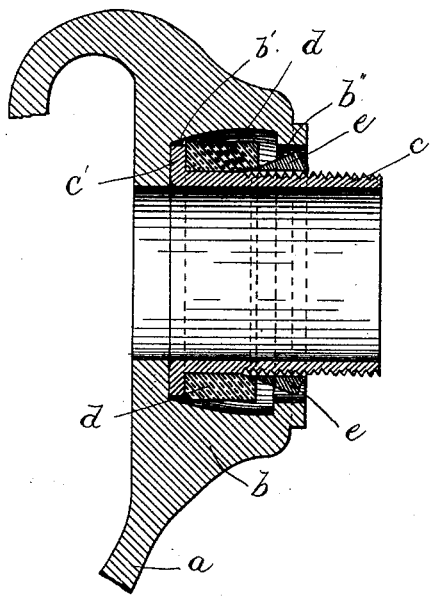
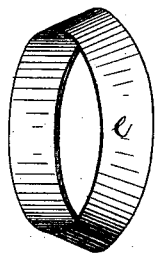
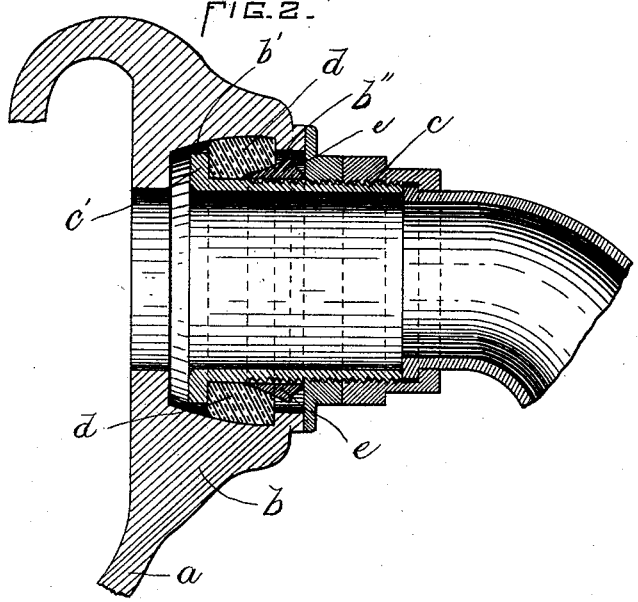
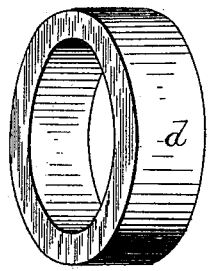
WITNESSES
W. C. Ramsay.
K. G. Brown
INVENTOR
T. McHugh
by Knight Brown Ronaly
Attys.

United States Patent Office.

TIMOTHY McHUGH, OF WAKEFIELD, ASSIGNOR OF ONE-HALF TO THE SMITH & ANTHONY STOVE COMPANY, OF BOSTON, MASSACHUSETTS.

COUPLING FOR WATER-CLOSET BOWLS.

SPECIFICATION forming part of Letters Patent No. 410,848, dated September 10, 1889.

Application filed May 31, 1889. Serial No. 312,715. (No model.)

*To all whom it may concern:*

Be it known that I, TIMOTHY MCHUGH, of Wakefield, in the county of Middlesex and State of Massachusetts, have invented certain new and useful Improvements in Couplings for Water-Closet Bowls, of which the following is a specification.

This invention has for its object to provide simple and effective means for securing a water-supply pipe to a water-closet bowl; and it consists in the combination, with a bowl having a flanged boss containing a socket, of a flanged pipe section or nipple formed to enter said socket, an expansible ring of rubber or like material formed to surround the nipple or pipe section within the boss, an annular wedge formed to slide upon the nipple, and a nut engaged with the threaded periphery of the nipple and formed to bear on the outer end of the boss and draw the flanged nipple outwardly, thereby causing the elastic ring to expand on the annnular wedge, so that the periphery of the ring will exceed the diameter of the opening through the flange of the boss, and also compressing the elastic ring edgewise between the flanges of the nipple and boss, as I will now proceed to describe.

Of the accompanying drawings, forming a part of this specification, Figure 1 represents a sectional view of my improved coupling before the parts are interlocked. Fig. 2 represents a similar view after the parts are interlocked. Figs. 3 and 4 represent, respectively, the annular wedge and the elastic ring in perspective.

The same letters of reference indicate the same parts in all the figures.

In the drawings, $a$ represents a part of the upper edge of a water-closet bowl, on the back of which is formed a boss $b$, containing a socket $b'$, the mouth or outer end of which is contracted by an inwardly-projecting annular flange $b''$ on the boss.

$c$ represents an externally-threaded coupling section or nipple having at one end a flange $c'$, which is of such diameter that it can pass through the opening surrounded by the flange $b''$.

$f$ represents a nut which engages the threaded periphery of the nipple $c$ and is formed to bear on the end of the boss $b$.

$d$ represents a rubber ring formed to surround the nipple $c$, its normal diameter being such that it can pass freely through the opening surrounded by the flange $b''$.

$e$ represents an annular wedge, which is adapted to slide on the nipple $c$, and is arranged to be inserted between the nipple and the ring $d$ for the purpose of expanding the latter.

In connecting the nipple $c$ to the boss $b$ the flanged end of the nipple, with the ring $d$ and wedge $e$, is inserted in the socket $b'$, as shown in Fig. 1. The nut $f$ is then applied to the nipple and turned up against the end of the boss, thereby forcing the wedge into the ring $d$, and at the same time drawing the nipple outwardly. The ring $d$ is expanded by the wedge, so that it cannot pass through the space surrounded by the flange $b''$, and in its expanded condition is caused to bear against the inner side of said flange by the endwise movement of the nipple. It will be seen, therefore, that the ring is expanded both by the action of the wedge and by compression between the flange $b''$ of the boss and the flange $c'$ of the nipple, so that close contact is insured between its outer end and the flange $b''$ and between its periphery and the surface of the socket $b'$, so that all possibility of leakage is avoided.

I claim—

The combination of the socketed boss $b$, having the inwardly-projecting flange $b''$, the flanged threaded nipple $c$, having the flange $c'$, the elastic ring $d$, the annular wedge $e$, and the nut $f$, engaged with the threaded nipple and formed to bear against the outer end of the boss, whereby, when said nut is turned against the boss, the wedge is forced into the ring and the nipple is drawn outwardly, as and for the purpose specified.

In testimony whereof I have signed my name to this specification, in the presence of two subscribing witnesses, this 17th day of May, A. D. 1889.

TIMOTHY McHUGH.

Witnesses:
C. F. BROWN,
A. D. HARRISON.